(12) United States Patent
Marcin et al.

(10) Patent No.: US 11,039,102 B1
(45) Date of Patent: Jun. 15, 2021

(54) VIDEO FEED REDUNDANCY

(71) Applicant: Twitch Interactive, Inc., San Francisco, CA (US)

(72) Inventors: Ivan Marcin, Palo Alto, CA (US); Jonas Bengtson, San Francisco, CA (US); Tarek Amara, Burlington (CA); Shawn Hsu, San Jose, CA (US); Abhinav Kapoor, Fremont, CA (US); Jorge Arturo Villatoro, San Francisco, CA (US); Eran Ambar, Sunnyvale, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 50 days.

(21) Appl. No.: 15/839,503

(22) Filed: Dec. 12, 2017

(51) Int. Cl.
| | |
|---|---|
| H04N 5/76 | (2006.01) |
| H04N 5/92 | (2006.01) |
| H04N 21/442 | (2011.01) |
| H04N 5/765 | (2006.01) |
| H04N 5/38 | (2006.01) |
| H04N 5/911 | (2006.01) |
| H04N 21/426 | (2011.01) |

(52) U.S. Cl.
CPC ............. *H04N 5/765* (2013.01); *H04N 5/38* (2013.01); *H04N 5/911* (2013.01); *H04N 5/92* (2013.01); *H04N 21/42607* (2013.01); *H04N 21/44209* (2013.01)

(58) Field of Classification Search
CPC ....... H04N 21/47202; H04N 21/23439; H04N 21/26216; H04N 21/25891; H04N 21/2385; H04N 21/6125; H04N 21/64738; H04N 21/25875; H04N 5/765; H04N 5/911; H04N 5/38; H04N 5/92; H04N 21/4622; H04N 21/4384; H04N 21/4331; H04N 21/4382; H04N 21/23418; H04N 21/44004; H04N 21/4383; H04N 21/47217; H04N 21/4335; H04N 1/32683; H04N 21/42607; H04N 21/44209; H04N 21/4586; H04N 21/6106; H04N 7/16
See application file for complete search history.

(56) References Cited

U.S. PATENT DOCUMENTS

| | | | | |
|---|---|---|---|---|
| 2007/0242829 | A1* | 10/2007 | Pedlow, Jr. | ............ H04N 7/162 380/277 |
| 2011/0296474 | A1* | 12/2011 | Babic | ..................... H04N 21/21 725/87 |
| 2014/0150042 | A1* | 5/2014 | Pacor | ............... H04N 21/21805 725/116 |

(Continued)

*Primary Examiner* — Mulugeta Mengesha
*Assistant Examiner* — Alazar Tilahun
(74) *Attorney, Agent, or Firm* — BakerHostetler

(57) ABSTRACT

Various techniques for providing video feed redundancy are described herein. Instructions may be provided for switching input to an output video feed between two or more redundant input video feeds. In some examples, the redundant input video feeds may not be duplicates, may not be frame synchronized, may not be transmitted from the same location, may not be transmitted using the same network types or transmission protocols, and/or may not be initiated at the same time. In some examples, the instructions for video feed redundancy may be associated with respective authorization keys for the redundant input video feeds.

20 Claims, 11 Drawing Sheets

(56) References Cited

U.S. PATENT DOCUMENTS

| | | | | |
|---|---|---|---|---|
| 2015/0040172 A1* | 2/2015 | Zelesko | ............ | H04N 21/4622 |
| | | | | 725/110 |
| 2015/0043892 A1* | 2/2015 | Groman | ............ | H04N 21/4627 |
| | | | | 386/278 |
| 2016/0127778 A1* | 5/2016 | Mishra | ............ | H04N 21/44008 |
| | | | | 725/114 |
| 2016/0381110 A1* | 12/2016 | Barnett | ................. | H04L 67/18 |
| | | | | 709/231 |
| 2017/0070772 A1* | 3/2017 | Nakamura | ......... | H04N 21/4383 |
| 2017/0111705 A1* | 4/2017 | Ma | .................... | H04N 21/6125 |

* cited by examiner

Redundancy Instructions 123

310A: Input Video Feed 110A Instruction Set (e.g., key)

Rtmp://UserA_Authtoken?rfeed=UserB&failover=ring

310B: Input Video Feed 110B Instruction Set (e.g., key)

Rtmp://UserB_Authtoken?rfeed=UserC&failover=ring&start_visibility=hidden

310C: Input Video Feed 110C Instruction Set (e.g., key)

Rtmp://UserC_Authtoken?rfeed=UserA&failover=ring&start_visibility=hidden

FIG. 3

Redundancy Instructions 423

610A: Input Video Feed 410A Instruction Set (e.g., key)

Rtmp://UserA_Authtoken?rfeed=UserB&failover=sustain&feed=primary

610B: Input Video Feed 410B Instruction Set (e.g., key)

Rtmp://UserB_Authtoken?rfeed=UserA&failover=sustain&primary=UserA&start_visibility=hidden

VIDEO FEED REDUNDANCY

BACKGROUND

The popularity of video streaming has increased rapidly in recent years. In some examples, video content may be captured by a video content provider and transmitted to a video streaming service. The video streaming service may then, in turn, transmit the video to a number of viewers. In some cases, the video content may correspond to an event, such as news event, a sporting event, or another event. In some examples, the video content may be transmitted to viewers and played using live streaming techniques. For example, video of an event may be transmitted to viewers and played while the event is still occurring, albeit with some latency between the time that video is captured by the provider and the time that the video is eventually played to viewers. In video streaming, one of the biggest concerns is stability of a video feed. Many video feeds are by nature unreliable and prone to disconnections, network starvation and lag, network splits, and other problems.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 3 is diagram illustrating example ring-type redundancy instructions that may be used in accordance with the present disclosure.

FIG. 6 is a diagram illustrating example sustain-type redundancy instructions that may be used in accordance with the present disclosure.

DETAILED DESCRIPTION

Figure 1:
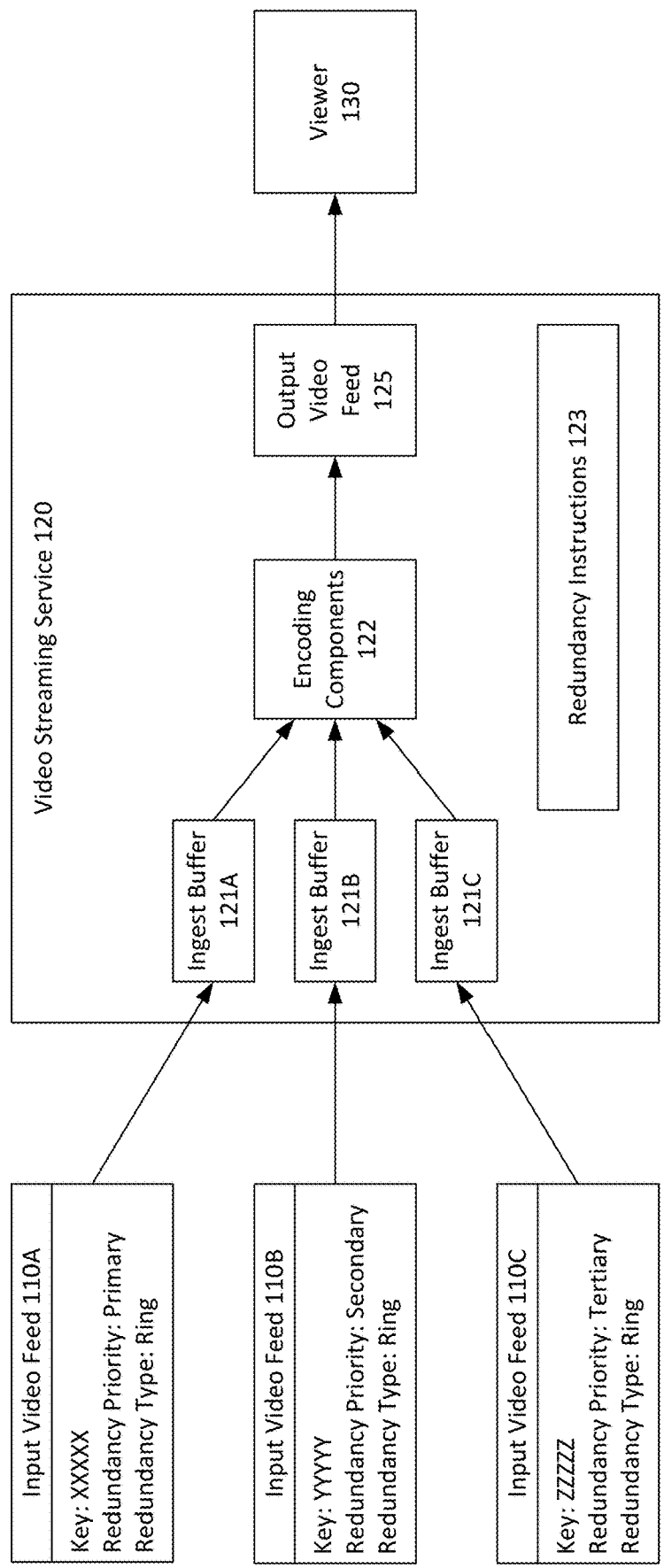
FIG. 1 is a diagram illustrating a first example redundancy system that may be used in accordance with the present disclosure.

Various techniques for providing video feed redundancy are described herein. In particular, in some examples, video content, for example corresponding to an event, such as a news event, a sporting event, or another event, may be transmitted to a number of viewers. In some examples, the video content may be provided by video content providers and transmitted as input feeds to a video streaming service. The video streaming service may then, in turn, encode and transmit the video content via output video feeds to a number of viewers. In some examples, the video content may be transmitted to viewers and played using live streaming techniques. For example, video of an event may be transmitted to viewers and played while the event is still occurring, albeit with some latency between the time that video is captured by the provider and the time that the video is eventually played to viewers.

In some examples, under stable operating conditions, the video streaming service may receive a first input video feed and encode and transmit the video content as a first output video feed. However, in some examples, the first input video feed may eventually disconnect, fail, experience network starvation or lag, or otherwise become unstable. In some examples, instructions may be provided to the video streaming service for providing video feed redundancy, such as in the case of these or other instability conditions. In particular, the instructions may indicate another (e.g., a second) input video feed to which to switch the first output video feed, meaning that the video included in the first output video feed is at least temporarily provided from the second input video feed instead of the first input video feed.

In some examples, the instructions may indicate a ring-type redundancy. For example, in some cases, instructions may be provided to switch an output video feed from a first input video feed to a second input video feed when the first input video feed becomes unstable. Additionally, instructions may be provided to switch from the second input video feed back to the first input video feed when the second input video feed becomes unstable. In some examples, the ring of redundant feeds may include more than two, or any number of, different feeds. For example, in some cases, a ring of redundant feeds may include three different feeds. In particular, instructions may be provided to switch from a first input video feed to a second input video feed when the first input video feed becomes unstable. Additionally, instructions may be provided to switch from the second input video feed to a third input video feed when the second input video feed becomes unstable. Furthermore, instructions may be provided to switch from the third input video feed to back to the first input video feed when the third input video feed becomes unstable.

In other examples, the instructions may indicate a redundancy that attempts to sustain a first input video feed, such as when the first input video feed recovers from a failure or other instability conditions. For example, in some cases, instructions may be provided to switch from a first input video feed to a second input video feed when the first input video feed becomes unstable. Additionally, instructions may be provided to switch from the second input video feed back to the first input video feed when the first input video feed recovers from being unstable. In this manner, the first input video feed may be returned to upon its recovery, for example as opposed to waiting until the second input video feed becomes unstable.

By providing instructions such as those described above, options for feed redundancy may be substantially enhanced, such as in comparison to conventional techniques. For example, one conventional technique for providing redundancy is a failover ingest. This means that a source video content provider may use two network connections to duplicate the video feed (e.g., send the same video feed twice). If one feed line disconnects, the encoder may capture data from the secondary feed in an instant failover. Often, this may involve a video content provider, such as in a stadium or other venue, employing two split Internet connections to send a duplicate video feed. This conventional approach may require that both feeds are frame synchronized. This conventional approach may also require the duplicate feeds to be initiated simultaneously with one another.

By contrast, the instruction-based redundancy techniques described herein do not require that redundant feeds must include the same (i.e., duplicate) video content. Moreover, the techniques described herein also do not require that redundant feeds are frame synchronized. In particular, the techniques herein may allow a number of enhanced options with respect to redundant video feeds. For example, redundant video feeds may be transmitted from different video content providers at different locations with respect to one another, such as from different locations within the same venue, or from entirely different venues or other remote locations. Additionally, in some examples, redundant video feeds may include different content. For example, a primary video feed may include video of a soccer game, while secondary redundant video feeds may include video of a basketball game, video of commentators talking about the soccer and/or basketball game, highlight clips from prior (e.g., non-live) soccer and/or basketball games, and the like. Furthermore, in some examples, redundant video feeds may be transmitted using different types of connections (e.g., wired, wireless, microwave, satellite, etc.) with respect to one another. Moreover, in some examples, any number of redundant video feeds may be employed, for example as opposed to being limited to only two feeds. Also, redundant feeds are not required to be initiated simultaneously, and may instead be initiated at any time irrespective of one another.

In some examples, each input video feed may have associated instructions, such as may be included in, or otherwise associated with, a unique key that identifies the input video feed to the video service provider. Also, in some examples, the instructions may include a number of values that indicate certain attributes for the feed. For example, the instructions may indicate another redundant feed to switch to, a redundancy type (e.g., ring, sustain, etc.), a redundancy priority (e.g., primary, secondary, tertiary, etc.) and other redundancy attributes. In some examples, the instructions may also indicate a start visibility status for a feed, which may provide an indication of whether a feed will be visible or hidden when it is initiated. For example, in some cases, a secondary feed may be used only as backup for another primary feed, and the secondary feed may remain hidden until the primary feed fails. By contrast, in some cases, a secondary feed may serve as a backup to a primary feed on the same output channel as the primary feed, but may also be continuously transmitted to viewers on a different output channel. In this case, the secondary feed may be visible (e.g., on the different channel) even before the primary feed becomes unstable.

In some examples, all redundant input feeds that are provided to the video streaming service may be buffered upon receipt by the streaming service, even during times when one or more of the feeds are hidden (i.e. not being transmitted to viewers). In this manner, when a failure occurs on a primary input feed, the designated secondary backup feed may be switched to immediately or almost immediately, because it has been continuously buffered even during times when it was hidden. It is noted, however, that hidden feeds, while being continuously buffered, may not actually be encoded during times when they are hidden. This may conserve encoding resources and reduce costs associated with unnecessarily encoding hidden video feeds.

FIG. 1 is a diagram illustrating an example ring redundancy system that may be used in accordance with the present disclosure. In particular, as shown in FIG. 1, three example input video feeds 110A, 110B and 110C may be included in a ring-type redundancy technique to provide redundancy for output video feed 125. Specifically, input video feeds 110A-C may be provided to video streaming service 120. Video streaming service 120 may, in turn, generate a output video feed 125 that is transmitted to at least one viewer 130. In some examples, input video feeds 110A-C and output video feed 125 may be transmitted over one or more communications networks, for example one or more local area networks (LAN's) and/or one or more wide area networks (WAN's), such as the Internet. Additionally, in some examples, input video feeds 110A-C and output video feed 125 may be transmitted using streaming transmission techniques, in which portions of transmitted content may be received and played while subsequent portions of the transmitted content are being transmitted.

In some examples, each of input video feeds 110A-C may have a unique authorization key that uniquely identifies the video feed to the video streaming service 120. A key may, for example, include or may otherwise be generated using a random hash. In some cases, the keys may be generated by the video streaming service 120. The providers of the input video feeds 110A-C may then be informed of the keys. In some examples, when a provider initiates streaming of an input video feed 110A-C, the provider may identify the feed by indicating the respective key for that feed to the video streaming service 120. As shown in FIG. 1, each of feeds 110A, 110B and 110C has a different associated key XXXXX, YYYYY and ZZZZZ, respectively. As should be appreciated, keys may have many different types of contents and formats, and the keys used in FIG. 1 are merely intended as non-limiting examples to indicate that different input feeds may have different respective keys.

Video streaming service 120 may generate output video feed 125 based on input video feeds 110A-C. In particular, as shown in FIG. 1, input video feed 110A is designated as a primary input video feed, input video feed 110B is designated as a secondary input video feed, and input video feed 110C is designated as a tertiary input video feed. As also shown in FIG. 1, input video feeds 110A-C are included in a ring-type redundancy. In particular, in some examples, when output video feed 125 is initiated, it may first receive and transmit video from the primary input video feed 110A. However, if the primary input video feed 110A experiences an instability condition (e.g., disconnection, failure, network starvation, lag, network split, etc.), the output video feed 125 may be switched from the primary input video feed 110A to the secondary input video feed 110C. Subsequently, if the secondary input video feed 110B experiences an instability condition, the output video feed 125 may again be switched from the secondary input video feed 110B to the tertiary input video feed 110C. If the tertiary input video feed 110C experiences an instability condition, the output video feed 125 may again be switched from the tertiary input video feed 110C back to the primary input video feed 110A. This switching may then be repeated as many times as appropriate based on the stability of the input video feeds 110A-C.

Figure 2:
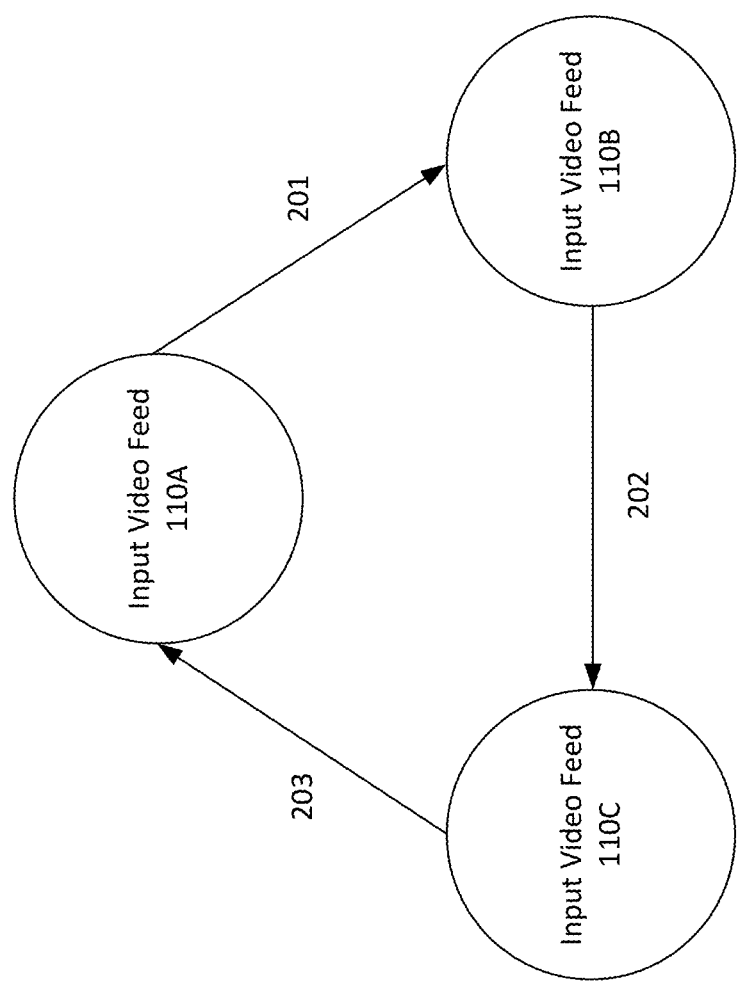
FIG. 2 is diagram illustrating first example redundancy switching that may be used in accordance with the present disclosure.

A diagram of the above-described ring redundancy switching of input video feeds 110A-C is shown in FIG. 2, in which a first arrow 201 points from input video feed 110A to input video feed 110B to indicate switching from input video feed 110A to input video feed 110B upon instability of input video feed 110A. Additionally, a second arrow 202 points from input video feed 110B to input video feed 110C to indicate switching from input video feed 110B to input video feed 110C upon instability of input video feed 110B. Furthermore, a third arrow 203 points from input video feed 110C back to input video feed 110A to indicate switching from input video feed 110C to input video feed 110A upon instability of input video feed 110C.

In the example of FIG. 1, each of input video feeds 110A, 110B and 110C may, upon being received by the video streaming service 120, be stored in a respective ingest buffer 121A, 121B and 121C. In some examples, ingest buffers 121A-C may be ring buffers, such as may receive incoming video, temporarily hold the incoming video for some period of time, and then eventually replace the incoming video with more recently received incoming video from the same input feed. In some examples, each of input video feeds 110A-C may be continuously buffered in their respective input buffers 121A-C, even during times when the input video feed is not being included in output video feed 125 (or otherwise being output to viewers 130). In this manner, when a failure occurs on a current input feed, the designated backup feed may be switched to immediately or almost immediately, because it has been continuously buffered.

As also shown in FIG. 1, the outputs of ingest buffers 121A-C may be provided to encoding components 122, which may encode the ingested video content for transmission to viewer 130. In some examples, while the input video feeds 110A-C may be continuously buffered, the input video feeds 110A-C may be provided to the encoding components 122 only during times when they are being output to viewers 130. In other words, the input video feeds 110A-C may not be encoded during times when they are not being output to viewers 130. This may conserve encoding resources and reduce costs associated with unnecessarily encoding hidden video feeds.

In the example of FIG. 1, the video streaming service 120 maintains redundancy instructions 123 for implementing redundancy techniques among input video feeds 110A-C. In some examples, all, or any portion of, the redundancy instructions may be provided to the video streaming service 120, such as from one or more providers that transmit one or more of the input video feeds 110A-C to the video streaming service 120. Referring now to FIG. 3, some examples of the redundancy instructions 123 will now be described in detail. In particular, in some examples, redundancy instructions 123 may be included in instruction sets 310A-C, which may each be assigned to, or otherwise associated with, one of input video feeds 110A-C, respectively. Additionally, in some examples, all, or any portion, of the instruction sets 310A-C may be included in, or otherwise associated with, the authorization keys that may be assigned to the respective input video feeds 110A-C, for example as described in detail above. For example, as shown in FIG. 3, each of instruction sets 310A-C includes an authorization token for a respective user/input feed that may be included in the key for that feed. In the example of FIG. 3, each of the instructions sets 310A-C is a uniform resource locator (URL) associated with Real-Time Messaging Protocol (RTMP) streaming. It is noted, however, that there is no requirement that redundancy instructions 123 must include URL's and that other types of formats of instructions may be employed. It is also noted that there is no requirement that input video feeds 110A-C are transmitted via RTMP and that other transmission protocols may be employed.

As shown in FIG. 3, each of instruction sets 310A-C includes data that indicates a respective redundant feed to which to switch output video feed 125. In particular, instruction set 310A includes the notation rfeed=UserB, which indicates a switch from input video feed 110A to input video feed 110B (as represented by arrow 201 of FIG. 2). Instruction set 31B includes the notation rfeed=UserC, which indicates a switch from input video feed 110B to input video feed 110C (as represented by arrow 202 of FIG. 2). Instruction set 310C includes the notation rfeed=UserA, which indicates a switch from input video feed 110C to input video feed 110A (as represented by arrow 203 of FIG. 2). Additionally, each of instruction sets 310A-C includes data that indicates a type of redundancy to employ for the respective input feed. In particular, each of instruction sets 310A-C includes the notation failover=ring, which indicates that a ring-type redundancy is being employed such as described in detail above.

As shown in FIG. 3, instruction sets 310B and 310C each include data that indicates their start visibility, which indicates whether or not their respective input video feeds 111B and 110C will be visible to viewers when they are initiated. In particular, in some examples, non-primary (e.g., secondary, tertiary, etc.) input video feeds 110B and 110C may serve only as backups to primary input video feed 110A. In this scenario, non-primary video feeds 110B and 110C may have their start visibility set to hidden, in order to indicate that they are hidden (i.e., not transmitted to viewers) when they are initiated. Specifically, in the example of FIG. 3, instruction sets 310B and 310C each include the notation start_visibility=hidden, which indicates that they are not transmitted to viewers until a higher priority feed becomes unstable. By contrast, in some examples, video feeds 110B and/or 110C may be transmitted to viewers via an alternate output video feed/channel that is different from output video feed 125. In this scenario, non-primary video feeds 110B and/or 110C may have their start visibility set to visible (e.g., as indicated by a notation such as start_visibility=visible), in order to indicate that they are transmitted to viewers on the alternative output feed/channel when they are initiated.

It is noted that, in the example of FIG. 3, instruction set 310A does not include a start_visibility indication, such as is included in instruction sets 310B and 31C. This is because instruction set 310A is assigned to the primary input video feed 111A, which may be transmitted upon its initiation over output video feed 125. Thus, it is not necessary to provide a start_visibility indication for primary input video feed 110A. In some examples, the omission of the start_visibility indication from the instruction set 310A may indicate to video streaming service 120 that input video feed 110A is the primary input video feed for output video feed 125.

In some examples, each of the keys or instruction sets 310A-C may be generated at the initiation of the primary input video feed 110A. It is noted however, that there is no requirement that the other input video feeds 110B and 110C must be initiated at the same time as primary input video feed 110A. By contrast, in some examples, input video feeds 110B and 110C may be initiated at any time irrespective of the time of initiation of primary input video feed 110A. In particular, in some examples, upon being initiated, the other input video feeds 110B and 110C may be identified to the video streaming service 120 simply by providing their respective authorization keys to the video streaming service 120. Thus, in some examples, by associating the redundancy instructions 123 with respective authorization keys of the input video feeds 110A-110C, the input video feeds 110A-C may be initiated at different times, for example as opposed to certain conventional techniques in which duplicate failover streams are required to be initiated simultaneously.

It is further noted that the use of redundancy instructions, such as the examples described above, may provide a number of additional advantages. For example, it is noted that input video feeds 110A-C need not necessarily include the same (i.e., duplicate) video content. Rather, in some examples, input video feeds 110A-C may include different content with respect to one another. In one specific example, primary input video feed 110A may include video of a soccer game, while secondary input video feed 110B may include video of a basketball game, and tertiary input video feed 110C may include video of commentators talking about the soccer and/or basketball game, highlight clips from prior (e.g., non-live) soccer and/or basketball games, and the like. Additionally, input video feeds 110A-C need not necessarily be frame synchronized with one another. Furthermore, input video feeds 110A-C may be transmitted from different locations with respect to one another, such as from different locations within the same venue, or from entirely different venues or other remote locations. Also, in some examples, input video feeds 110A-C may be transmitted using different types of connections (e.g., wired, wireless, microwave, satellite, etc.) with respect to one another. Moreover, it is noted that, while three redundant input video feeds 110A-C are employed in the examples of FIGS. 1-3, the techniques described herein may allow any number of different redundant video feeds to be employed.

The examples shown in FIGS. 1-3 relate to a ring-type redundancy, such as in which feeds may be switched when a currently selected feed becomes unstable. It is noted, however, that many other types of redundancy may also be employed. Another example redundancy type that may be used is a sustain-type redundancy, such as in which a primary video feed may switched back to upon its recovery from an instability condition. Some examples of the sustain-type redundancy will now be described in detail with reference to FIGS. 4-6.

Figure 4:
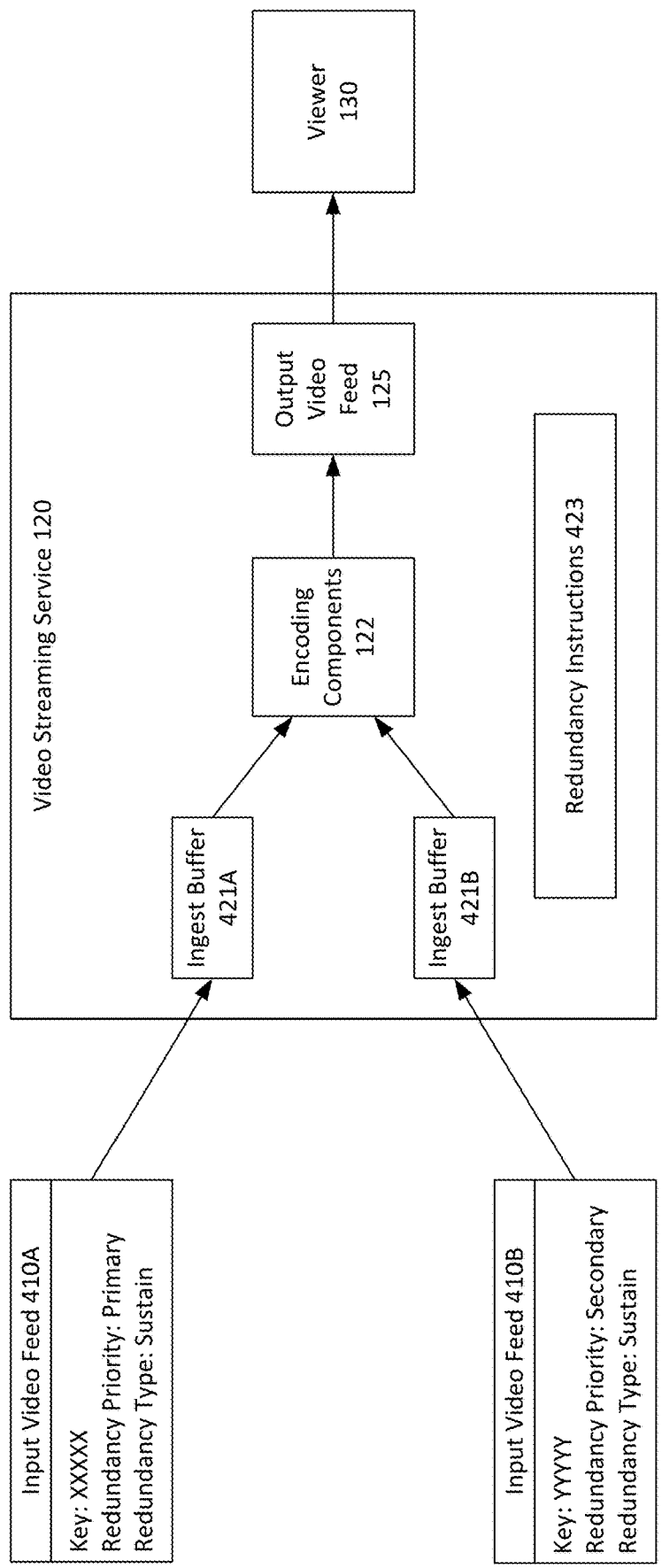
FIG. 4 is a diagram illustrating a second example redundancy system that may be used in accordance with the present disclosure.

In particular, as shown in FIG. 4, two example input video feeds 410A and 410B may be included in a sustain-type redundancy technique to provide redundancy for output video feed 125. Video streaming service 120 may generate output video feed 125 based on input video feeds 410A-B. In particular, as shown in FIG. 4, input video feed 410A is designated as a primary input video feed, and input video feed 410B is designated as a secondary input video feed. In some examples, when output video feed 125 is initiated, it may first receive and transmit video from the primary input video feed 410A. However, if the primary input video feed 410A experiences an instability condition (e.g., disconnection, failure, network starvation, lag, network split, etc.), the output video feed 125 may be switched from the primary input video feed 410A to the secondary input video feed 410B. However, unlike the ring-type redundancy of FIGS. 1-3, the primary input video feed 410A is sustained in the redundancy of FIGS. 4-6. This means that, when the primary input video feed 410A recovers from the instability condition, the output video feed 125 may again be switched from the secondary input video feed 410B back to the primary input video feed 410A. Thus, the output video feed 125 does not retain the secondary input video feed 410B until it becomes unstable. Rather, output video feed 125 is switched back to the primary input video feed 410A upon its recovery.

Figure 5:
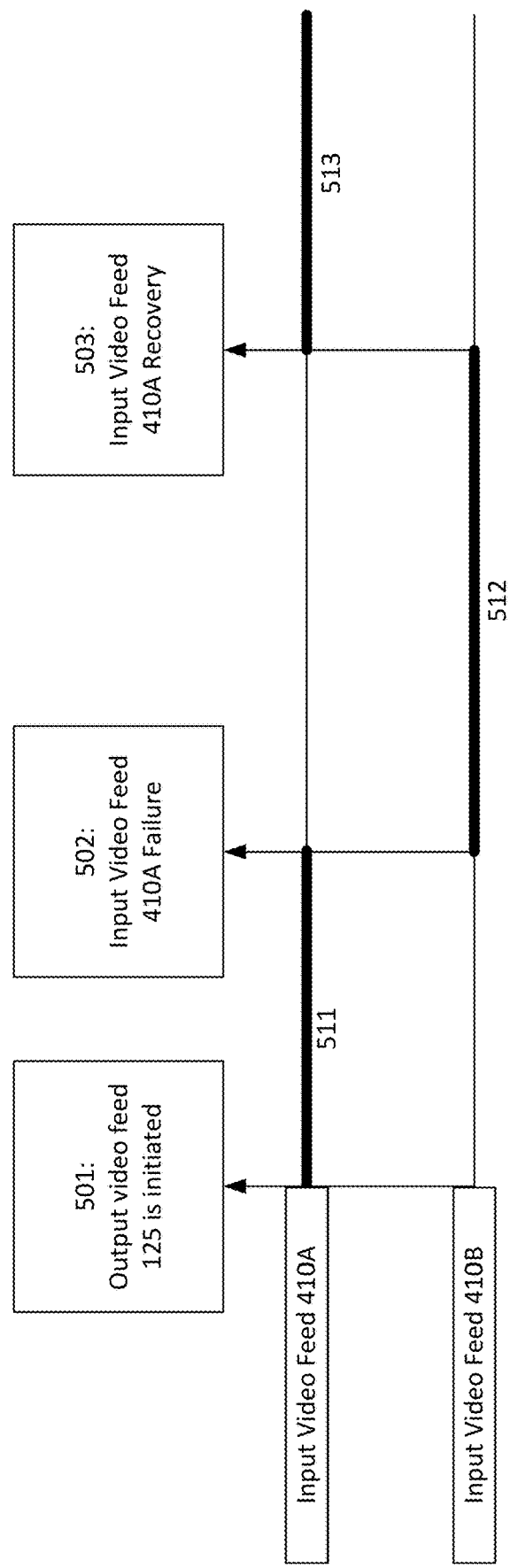
FIG. 5 is a diagram illustrating second example redundancy switching that may be used in accordance with the present disclosure.

A diagram of the above-described sustain redundancy switching of input video feeds 410A-B is shown in FIG. 5. As shown, at time 501, output video feed 125 is initiated. Upon initiation of output video feed 125, primary input video feed 410A is included in the output video feed 125. The inclusion of primary input video feed 410A in output video feed 125 subsequent to time 501 is indicated by the thick bold line segment 511. At a subsequent time 502, a transmission failure occurs on primary input video feed 410A, for example such that the feed is temporarily not received by the video streaming service 120. In response to this failure, the output video feed 125 is switched from the primary input video feed 410A to the secondary input video feed 410B. The inclusion of secondary input video feed 410B in output video feed 125 subsequent to time 502 is indicated by the thick bold line segment 512. At another subsequent time 503, primary input video feed 410A recovers from its prior transmission failure and is again received by the video streaming service 120. In response to this recovery, the output video feed 125 is switched back from the secondary input video feed 410B to the primary input video feed 410A. The inclusion of primary input video feed 410A in output video feed 125 subsequent to time 503 is indicated by the thick bold line segment 513. It is noted that the switching patter shown in FIG. 5 and described above may be repeated as many times as appropriate based on the stability of primary input video feed 410A.

Similar to FIG. 1, each of input video feeds 410A and 410B may, upon being received by the video streaming service 120, be stored in a respective ingest buffer 421A and 421B. In some examples, each of input video feeds 410A-B may be continuously buffered, even during times when the input video feed is not being included in output video feed 125 (or otherwise being output to viewers 130). In some examples, while the input video feeds 410A-B may be continuously buffered, the input video feeds 410A-B may be provided to the encoding components 122 only during times when they are being output to viewers 130.

In the example of FIG. 4, the video streaming service 120 maintains redundancy instructions 423 for implementing redundancy techniques among input video feeds 410A-B. Referring now to FIG. 6, some examples of the redundancy instructions 423 will now be described in detail. In particular, in some examples, redundancy instructions 423 may be included in instruction sets 610A-B, which may each be assigned to, or otherwise associated with, one of input video feeds 410A-B, respectively. Additionally, in some examples, all, or any portion of, the instruction sets 610A-B may be included in, or otherwise associated with, the authorization keys that may be assigned to the respective input video feeds 410A-B, for example as described in detail above. For example, as shown in FIG. 6, each of instruction sets 610A-B includes an authorization token for a respective user/input feed that may be included in the key for that feed.

As shown in FIG. 6, each of instruction sets 610A-B includes data that indicates a respective redundant feed to which to switch output video feed 125. In particular, instruction set 610A includes the notation rfeed=UserB, which indicates a switch from input video feed 410A to input video feed 410B (e.g., as shown at time 502 of FIG. 5). Instruction set 610B includes the notation rfeed=UserA, which indicates a switch from input video feed 410B to input video feed 410A (e.g., as shown at time 503 of FIG. 5). Additionally, each of instruction sets 610A-B includes data that indicates a type of redundancy to employ for the respective input feed. In particular, each of instruction sets 610A-B includes the notation failover=sustain, which indicates that a sustain-type redundancy is being employed such as described in detail above. Furthermore, instruction set 610A includes the notation feed=primary, which indicates that input video feed 410A is the primary input video feed. Instruction set 610B includes the notation primary=UserA, which also indicates that input video feed 410A is the primary input video feed. As described above, in a sustain-type redundancy, the primary video feed may be displayed initially. Additionally, the primary input video feed may be switched from when it becomes unstable and switched back to upon its recovery from instability conditions.

As shown in FIG. 6, instruction set 610B includes data that indicates its start visibility, which indicates whether or not its respective input video feed 410B will be visible to viewers when it is initiated. In particular, in some examples, secondary input video feed 410B may serve only as a backup to primary input video feed 410A. In this scenario, secondary input video feed 410B may have its start visibility set to hidden, in order to indicate that it is hidden (i.e., not transmitted to viewers) when it is initiated. Specifically, in the example of FIG. 6, instruction set 610B includes the notation start_visibility=hidden, which indicates that its respective input video feed 410B is not transmitted to viewers until primary input video feed 410A becomes unstable. By contrast, in some examples, secondary input video feed 410B may be transmitted to viewers via an alternate output video feed/channel that is different from output video feed 125. In this scenario, secondary input video feed 410B may have its start visibility set to visible (e.g., as indicated by a notation such as start_visibility=visible), in order to indicate that it is transmitted to viewers on the alternative output feed/channel when it is initiated.

It is noted that, in the example of FIG. 6, instruction set 610A does not include a start_visibility indication, such as is included in instruction set 610B. This is because instruction set 610A is assigned to the primary input video feed 410A, which may be transmitted upon its initiation over output video feed 125. Thus, it is not necessary to provide a start_visibility indication for primary input video feed 410A. In some examples, the omission of the start_visibility indication from the instruction set 610A may indicate to video streaming service 120 that input video feed 410A is the primary input video feed for output video feed 125.

In the examples of FIGS. 1-6, each of the redundant input video feeds 110A-C and 410A-B may have different respective assigned keys, such as described in detail above. In some examples, however, redundant input video feeds may share the same key, such as by rotating use of a single key. In one specific example, a provider of a first input video feed may log-in with a particular key and initiate transmission of the first input video feed, which may be included in a respective output video feed associated with the particular key. The provider of the first video feed may then eventually log-off, and a provider of a second input video feed may then log-on using the same key associated with the same output video feed. The second input video feed may then be included in the respective video output feed. This process may then be repeated to switch to any number of different input video feeds from providers that log-on using the same particular key. One challenge associated with the above example is that sharing a key among several different input video feed providers may, in some examples, increase a risk that the key will be exposed to unauthorized parties, thereby potentially allowing the unauthorized parties to provide video that is included in the video output stream. In some examples, to reduce this risk, a particular secret may be associated with the key and shared among the authorized redundant video feed providers. The redundant video feed providers may then provide this shared secret in order to have their input video feeds included in the output video feed. By employing the shared secret, the parties may share access to the output video feed without requiring sharing of the key itself.

Figure 7:
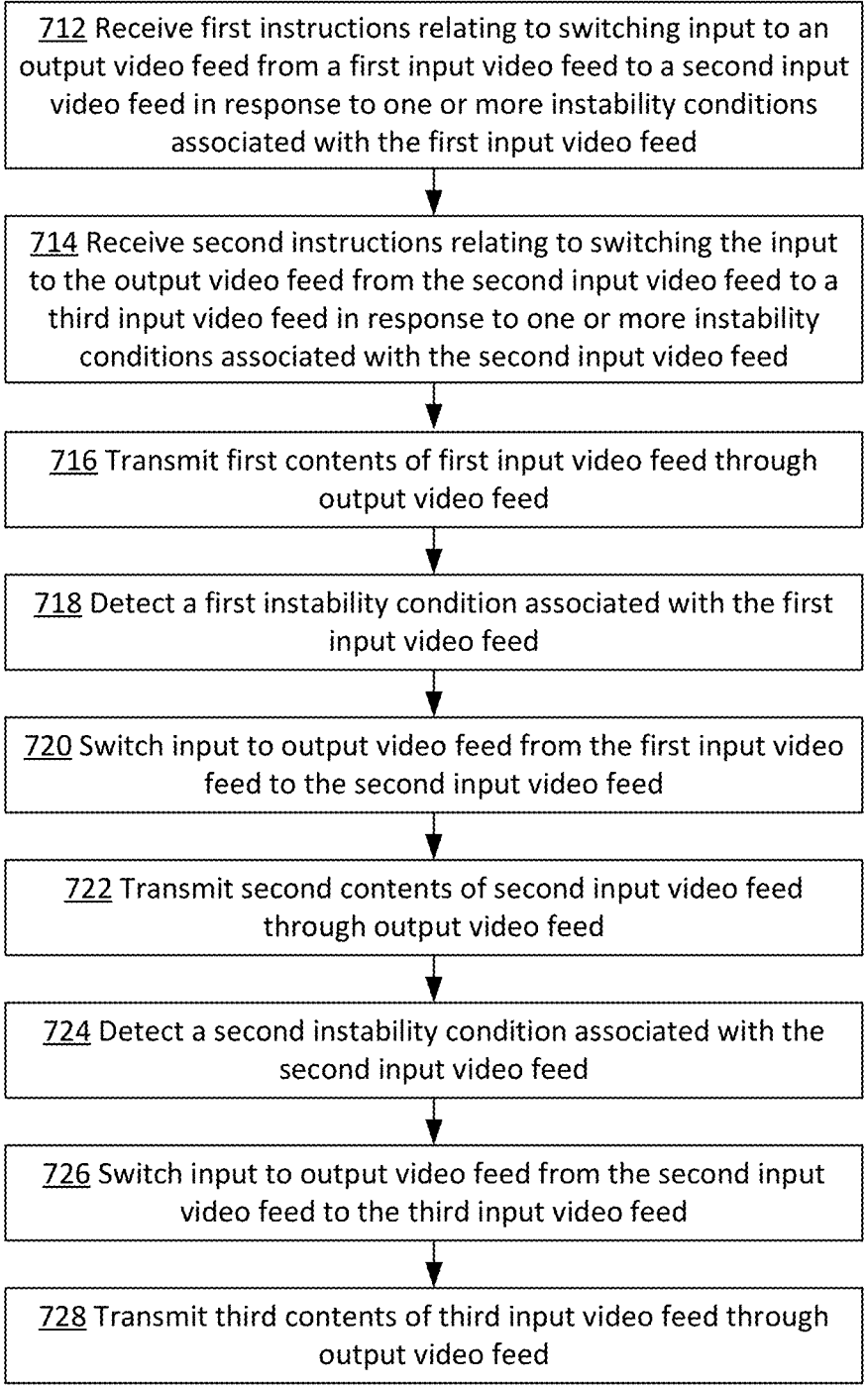
FIG. 7 is a flowchart illustrating a first example process for providing an output video feed that may be used in accordance with the present disclosure.

Some example processes for providing an output video feed will now be described in detail with reference to FIGS. 7-9. In particular, FIG. 7 depicts a first example process 700 relating to a ring-type redundancy with three (or more) input video feeds, for example such as shown in FIGS. 1-3 and described above. Process 700 is initiated at operation 712, at which first instructions are received relating to switching an input to an output video feed from a first input video feed to a second input video feed in response to one or more instability conditions associated with the first input video feed. For example, as shown in FIG. 3, instruction set 310A includes example first instructions that may be received at operation 712. In particular, instruction set 310A relates to switching an input to an output video feed (e.g., output video feed 125) from a first input video feed (e.g., input video feed 110A) to a second input video feed (e.g., input video feed 110B) in response to one or more instability conditions associated with the first input video feed. Specifically, instruction set 310A includes the notation rfeed=UserB, which indicates a switch from input video feed 110A to input video feed 110B (corresponding to UserB). Additionally, instruction set 310A includes the notation failover=ring, which indicates that a ring-type redundancy is being employed. As described above, in the ring-type redundancy, an input to an output video feed is switched from a current input video feed to another input video feed in response to one or more instability conditions associated with the current input video feed. Thus, in the example of instruction set 310A, the notations rfeed=UserB and failover=ring are instructions to switch an input to an output video feed from a first input video feed to a second input video feed in response to one or more instability conditions associated with the first input video feed. As set forth above, the one or more instability conditions may include, for example, a disconnection, a transmission failure, a delay, an error, and/or a reduction in quality associated with the first input video feed.

As set forth above, in some examples, the first input video feed may not be a duplicate of the second input video feed. Moreover, the first input video feed may not be frame synchronized with the second input video feed. Also, the first input video feed may be transmitted from a different location than the second input video feed. Additionally, transmission of the first input video feed may be initiated at a different time than the second input video feed. Furthermore, the first input video feed may be transmitted using a different type of network and/or a different transmission protocol than is used to transmit the second input video feed. As also set forth above, in some examples, the first instructions received at operation 712 may be associated with a first key assigned to a provider of the first input video feed and a second key assigned to a provider of the second input video feed.

At operation 714, second instructions are received relating to switching the input to the output video feed from the second input video feed to a third input video feed in response to one or more instability conditions associated with the second input video feed. For example, as shown in FIG. 3, instruction set 310B includes example second instructions that may be received at operation 714. In particular, instruction set 310A relates to switching an input to an output video feed (e.g. output video feed 125) from a second input video feed (e.g., input video feed 110B) to a third input video feed (e.g., input video feed 110C) in response to one or more instability conditions associated with the second input video feed. Specifically, instruction set 310B includes the notation rfeed=UserC, which indicates a switch from input video feed 110B to input video feed 110C (corresponding to UserC). Additionally, instruction set 310B includes the notation failover=ring, which indicates that a ring-type redundancy is being employed. As described above, in the ring-type redundancy, an input to an output video feed is switched from a current input video feed to another input video feed in response to one or more instability conditions associated with the current input video feed. Thus, in the example of instruction set 310A, the notations rfeed=UserC and failover=ring are instructions to switch an input to an output video feed from a second input video feed to a third input video feed in response to one or more instability conditions associated with the second input video feed.

At operation 716, first contents of the first input video feed are transmitted through the output video feed. For example, the first contents of the first input video feed may be encoded by the video streaming service 120 for transmission to at least one viewer 130. Video streaming service 120 may then transmit the contents of the first input video feed through the output video feed to the at least one viewer 130, such as using streaming content delivery techniques. As described above, in some examples, the second input video feed may not be visible to users (i.e., hidden) during times when the first input video feed is transmitted through the output video feed. As also described above, in some examples, the second input video feed may be continuously buffered, for example even during times when it is not visible to users. Additionally, in some examples, the second input video feed may not be encoded during the times when it is not visible to users, such as to not unnecessarily use encoding resources.

At operation 718, a first instability condition associated with the first input video feed is detected. As set forth above, the first instability condition may include, for example, a disconnection, a transmission failure, a delay, an error, and/or a reduction in quality associated with the first input video feed. In some examples, the first instability condition may be detected by monitoring the first input video feed, such as monitoring of an ingestion buffer that may buffer contents of the first input video feed and/or an encoder that may encode contents of the first input video feed, for example to detect failed and/or delayed fetches/requests for the first input video feed, errors, and other instability conditions.

At operation 720, the input to the output video feed may be switched from the first input video feed to the second input video feed. For example, the switching of operation 720 may be performed based, at least in part, on the detection of the first instability condition at operation 718 and/or the first instructions received at operation 712. In some examples, upon being switched, the output video feed may at least temporarily cease to include contents of the first input video feed. Instead, upon being switched, the output video feed may begin to include contents of the second input video feed. At operation 722, second contents of the second input video feed are transmitted through the output video feed.

At operation 724, a second instability condition associated with the second input video feed is detected. In some examples, operation 724 may be performed similarly to operation 718 described in detail above, with the exception that the second instability condition detected at operation 724 is associated with the second input video feed as opposed to the first input video feed. At operation 726, the input to the output video feed may be switched from the second input video feed to the third input video feed. For example, the switching of operation 726 may be performed based, at least in part, on the detection of the second instability condition at operation 724 and/or the second instructions received at operation 714. In some examples, upon being switched, the output video feed may at least temporarily cease to include contents of the second input video feed. Instead, upon being switched, the output video feed may begin to include contents of the third input video feed. At operation 728, third contents of the third input video feed are transmitted through the output video feed.

It is noted that, although not depicted in FIG. 7, additional instructions may also be received relating to switching the input to the output video feed from the third input video feed to another input video feed in response to one or more instability conditions associated with the third input video feed. For example, as shown in FIG. 3, instruction set 310C includes example instructions relating to switching an input to an output video feed (e.g., output video feed 125) from a third input video feed (e.g., input video feed 110C) back first input video feed (e.g., input video feed 110A) in response to one or more instability conditions associated with the third input video feed. In other examples, instead of switching back to the first input video feed, the output video feed could be switched to a fourth input video feed, and then a fifth input video feed, and so forth. Instability conditions may then be detected, and the switching may then be responsively performed based on the instability conditions and the additional instructions.

While the example of FIG. 7 relates to a ring-type redundancy with three or more redundant input video streams, it is noted that a ring-type redundancy may also sometimes include only two redundant input video streams. In particular, FIG. 8 depicts a second example process 800 relating to a ring-type redundancy with only two input video feeds. It is noted that operations 812 and 816-824 of FIG. 8 are identical to operations 712 and 716-724 of FIG. 7 and their description is not repeated here. FIG. 8 differs from FIG. 7 with respect to operations 814, 826 and 828. In particular, at operation 814, second instructions are received relating to switching the input to the output video feed from the second input video feed back to the first input video feed in response to one or more instability conditions associated with the second input video feed. Thus, in operation 814, the instructions are for switching back to the first input video feed (thereby creating a ring with two input feeds). This differs from operation 714 of FIG. 7, in which the instructions are for switching to a third input video feed (thereby creating a ring with three or more input feeds).

Referring now to operation 826, it is seen that, upon detection of the second instability condition at operation 824, the input to the output video feed may be switched from the second input video feed back to the first input video feed. This is in contrast with operation 726 of FIG. 7, in which the input to the output video feed is switched from the second input video feed to the third input video feed. At operation 828, third contents of the first input video feed are transmitted through the output video feed. Operations 818-828 may then be repeated as necessary based on detection of instability conditions associated with the first and second input video feeds.

Figure 8:
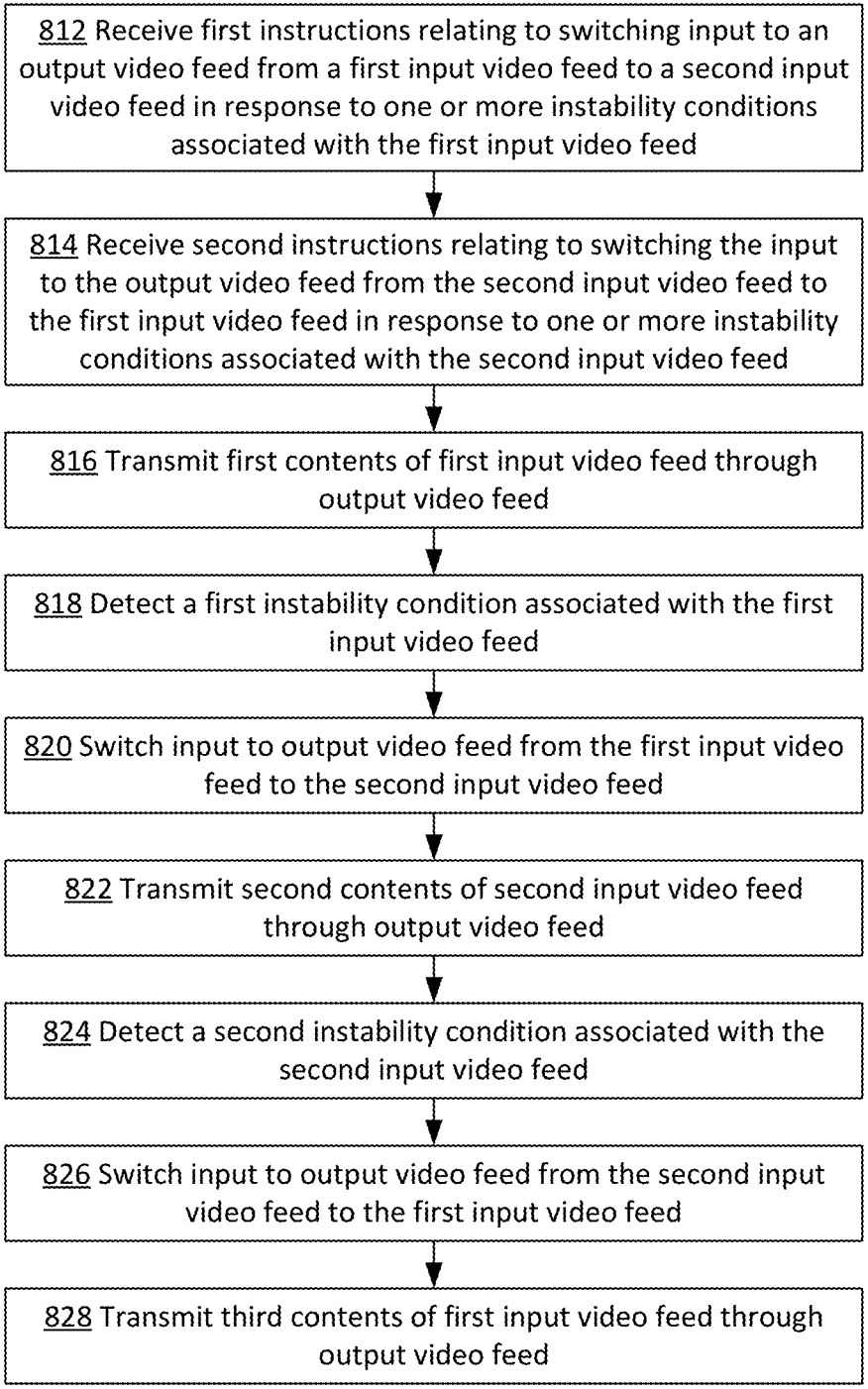
FIG. 8 is a flowchart illustrating a second example process for providing an output video feed that may be used in accordance with the present disclosure.

While the examples of FIGS. 7 and 8 relate to a ring-type redundancy, it is noted that other redundancy types may also be employed. In particular, FIG. 9 depicts a third example process 900 relating to a sustain-type redundancy, for example such as shown in FIGS. 4-6 and described above. Process 900 is initiated at operation 912, at which first instructions are received relating to switching an input to an output video feed from a first input video feed to a second input video feed in response to one or more instability conditions associated with the first input video feed. For example, as shown in FIG. 6, instruction set 610A includes example first instructions that may be received at operation 912. In particular, instruction set 610A relates to switching an input to an output video feed (e.g., output video feed 125) from a first input video feed (e.g., input video feed 410A) to a second input video feed (e.g., input video feed 410B) in response to one or more instability conditions associated with the first input video feed. Specifically, instruction set 610A includes the notation rfeed=UserB, which indicates a switch from input video feed 410A to input video feed 410B (corresponding to UserB). Additionally, instruction set 610A includes the notation failover=sustain, which indicates that a sustain-type redundancy is being employed. Furthermore, instruction set 610A includes the notation feed=primary, which indicates that input video feed 410A is the primary input video feed. As described above, in the sustain-type redundancy, the primary video feed may be displayed initially. Additionally, the primary input video feed may be switched from when it becomes unstable and switched back to upon its recovery from instability conditions. Thus, in the example of instruction set 610A, the notations rfeed=UserB, failover=sustain and feed=primary are instructions to switch an input to an output video feed from a first input video feed to a second input video feed in response to one or more instability conditions associated with the first input video feed.

At operation 914, second instructions are received relating to switching the input to the output video feed from the second input video feed to the first input video feed in response to a recovery condition associated with the first input video feed. For example, as shown in FIG. 6, instruction set 610B includes example second instructions that may be received at operation 914. In particular, instruction set 610B relates to switching an input to an output video feed (e.g., output video feed 125) from a second input video feed (e.g., input video feed 410B) to a first input video feed (e.g., input video feed 410A) in response to a recovery condition associated with the first input video feed. Specifically, instruction set 610B includes the notation rfeed=UserA, which indicates a switch from input video feed 410B to input video feed 410A (corresponding to UserA). Additionally, instruction set 610B includes the notation failover=sustain, which indicates that a sustain-type redundancy is being employed. Furthermore, instruction set 610B includes the notation primary=UserA, which indicates that input video feed 410A is the primary input video feed. As described above, in the sustain-type redundancy, the primary input video feed may be switched from when it becomes unstable and switched back to upon its recovery from instability conditions. Thus, in the example of instruction set 610B, the notations rfeed=UserA, failover=sustain and primary=UserA are instructions to switch the input to the output video feed from the second input video feed to the first input video feed in response to a recovery condition associated with the first input video feed.

Figure 9:
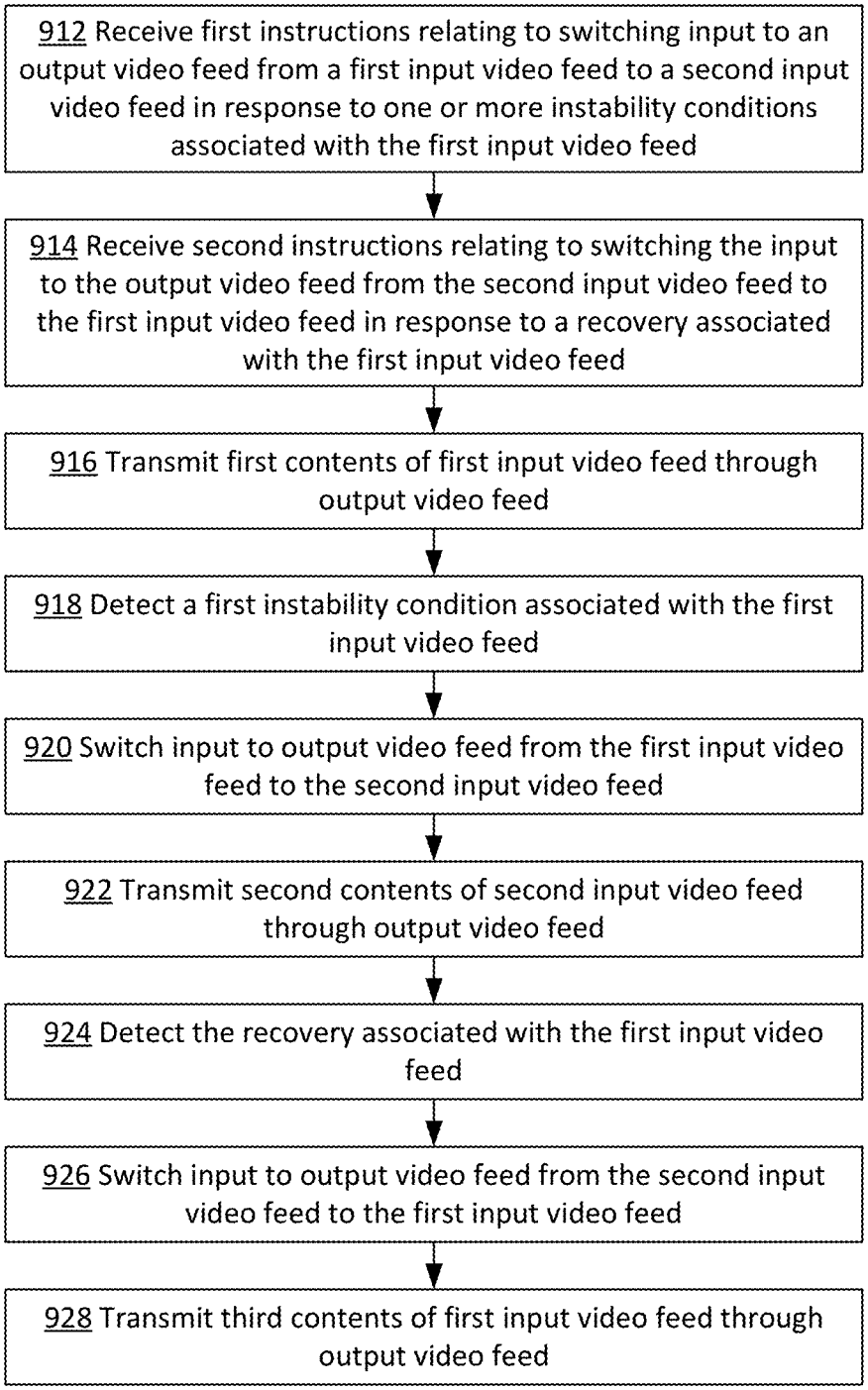
FIG. 9 is a flowchart illustrating a third example process for providing an output video feed that may be used in accordance with the present disclosure.

It is noted that operations 916-922 of FIG. 9 are identical to operations 716-722 of FIG. 7 and their description is not repeated here. Referring now to operation 924, subsequent to switching to the second input video feed at operation 922, a recovery associated with the first input video feed is detected. The recovery may include, for example, a reconnection, a cessation of delays, errors, and/or other recovery conditions. In some examples, the recovery may be detected by monitoring the first input video feed and/or its ingestion buffer, encoder or other components.

Referring now to operation 926, it is seen that, upon detection of the recovery at operation 924, the input to the output video feed may be switched from the second input video feed back to the first input video feed, thereby sustaining the first input video feed. At operation 928, third contents of the first input video feed are transmitted through the output video feed. Operations 918-828 may then be repeated as necessary based on detection of instability conditions and recovery conditions associated with the first input video feed.

Figure 10:
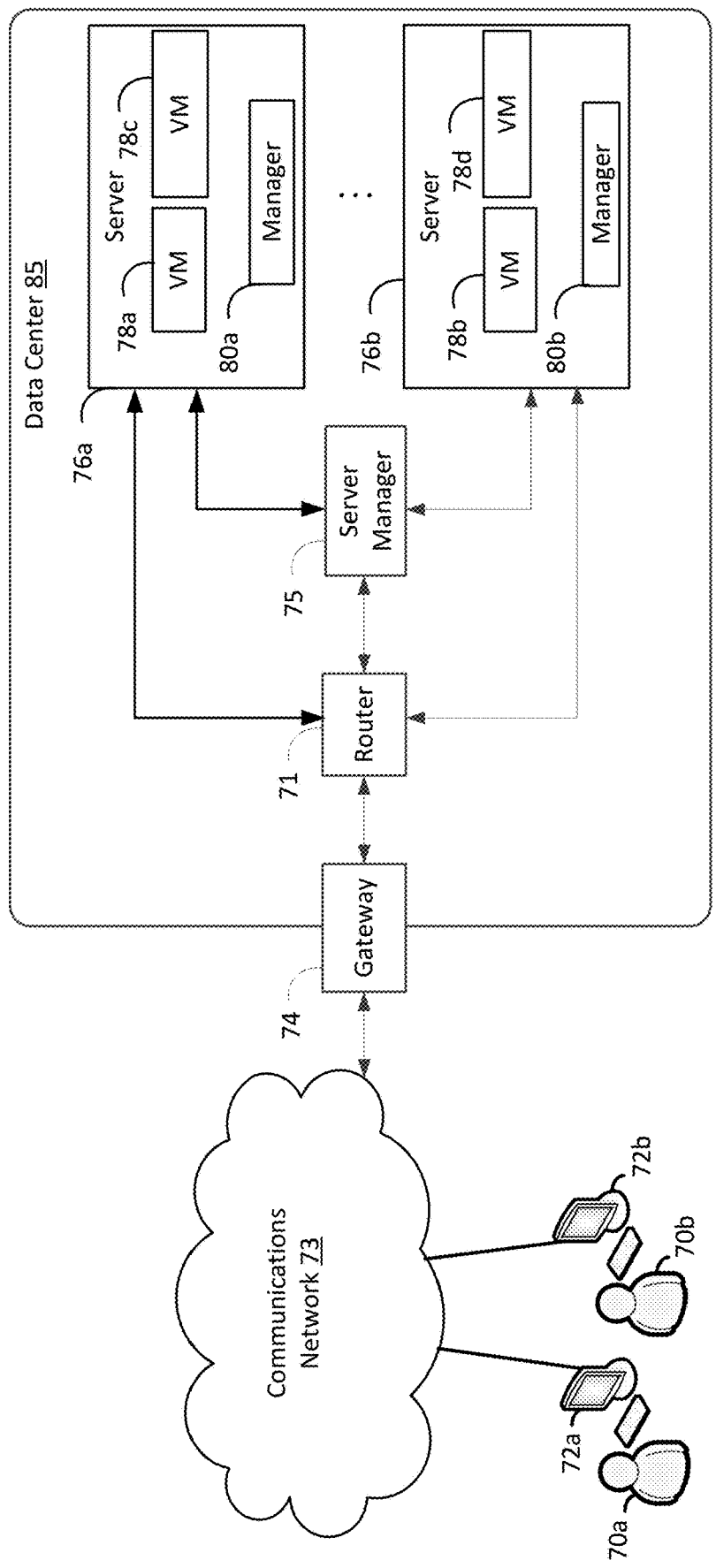
FIG. 10 is a diagram illustrating an example system for transmitting and providing data that may be used in accordance with the present disclosure.

An example system for transmitting and providing data will now be described in detail. In particular, FIG. 10 illustrates an example computing environment in which the embodiments described herein may be implemented. FIG. 10 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 10, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 10 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 10, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 10, a server manager 75 is also employed to at least in part direct various communications to, from and/or between servers 76a and 76b. While FIG. 10 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 85 described in FIG. 10 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 11:
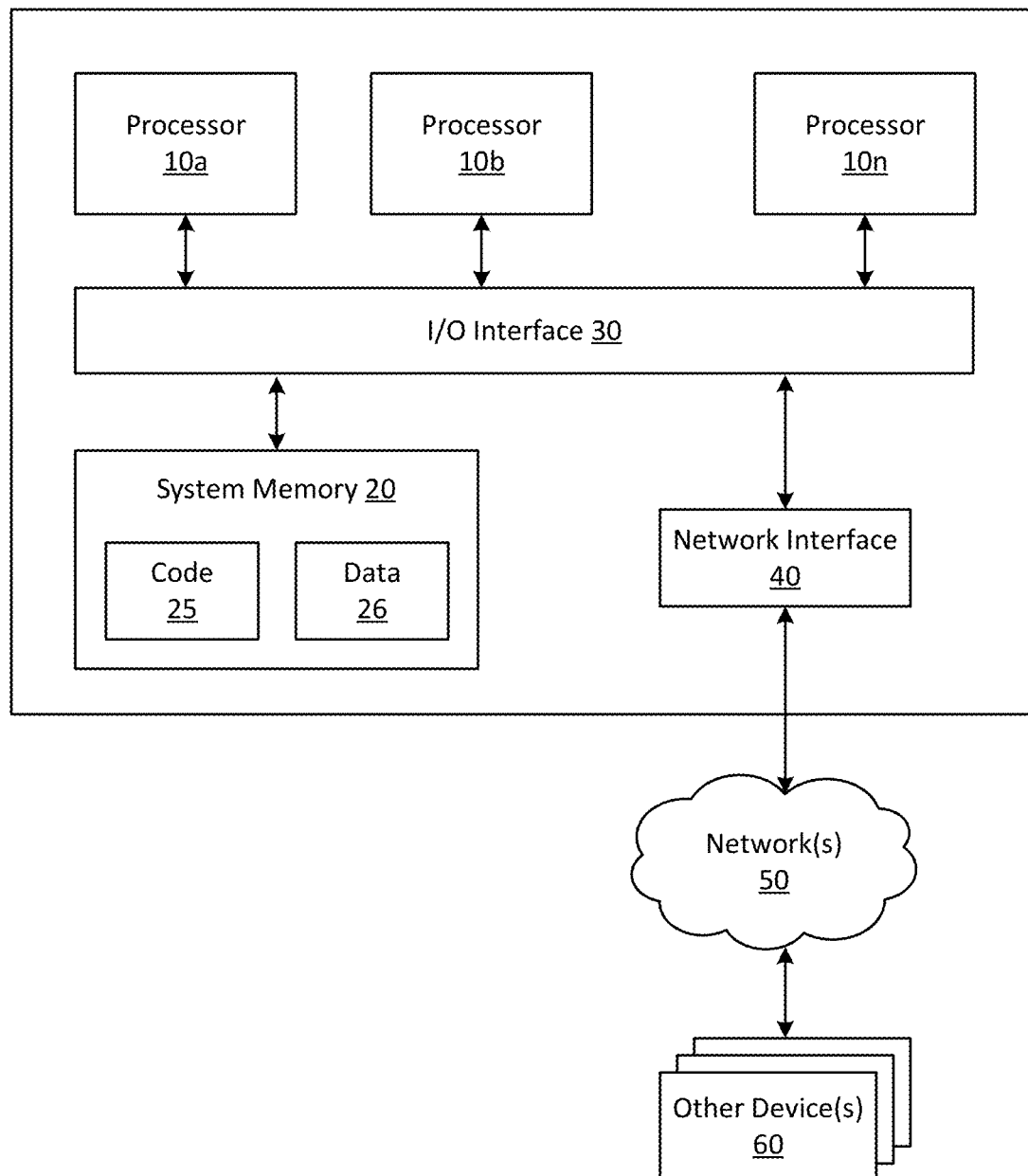
FIG. 11 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 11 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g. two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash©-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Asset forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for providing an output video feed comprising:
   one or more processors; and
   one or more memories having stored therein computing instructions that, upon execution by the one or more processors, cause the computing system perform operations comprising:
      receiving, by a live video streaming service, from a user, redundancy instructions relating to switching an input to the output video feed from a first input video feed to a second input video feed in response to one or more instability conditions associated with the first input video feed, wherein the first input video feed includes video of a live event, wherein the user captures video that is included in the first input video feed at a venue at which the live event occurs and transmits the first input video feed from the venue to the live video streaming service, and wherein the redundancy instructions include authorization information that allows the user to identify the first input video feed to the live video streaming service;
      transmitting, by the live video streaming service, first contents of the first input video feed through the output video feed;
      detecting, by the live video streaming service, one or more instability conditions associated with the first input video feed;
      performing, by the live video streaming service, a switch of the input to the output video feed from the first input video feed to the second input video feed; and
      transmitting, by the live video streaming service, second contents of the second input video feed through the output video feed.

2. The computing system of claim 1, wherein the one or more instability conditions comprise at least one of a disconnection, a transmission failure, a delay, an error, or a reduction in quality.

3. The computing system of claim 1, wherein the second input video feed is buffered during times when it is not visible to users but is not encoded during the times when it is not visible to users.

4. The computing system of claim 1, wherein the first input video feed is transmitted using at least one of a different type of network or a different transmission protocol than is used to transmit the second input video feed.

5. The computing system of claim 1, wherein the first input video feed is not a duplicate of the second input video feed.

6. The computing system of claim 1, wherein the first input video feed is transmitted from a different location than the second input video feed.

7. The computing system of claim 1, wherein transmission of the first input video feed is initiated at a different time than the second input video feed.

8. A computer-implemented method for providing an output video feed comprising:
   receiving, by a live video streaming service, from a user, redundancy instructions relating to switching an input to the output video feed from a first input video feed to a second input video feed in response to one or more instability conditions associated with the first input video feed, wherein the first input video feed includes video of a live event, wherein the user captures video that is included in the first input video feed at a venue at which the live event occurs and transmits the first input video feed from the venue to the live video streaming service, and wherein the redundancy instructions include authorization information that allows the user to identify the first input video feed to the live video streaming service;
   transmitting, by the live video streaming service, first contents of the first input video feed through the output video feed;
   detecting, by the live video streaming service, one or more instability conditions associated with the first input video feed;
   performing, by the live video streaming service, a switch of the input to the output video feed from the first input video feed to the second input video feed; and
   transmitting, by the live video streaming service, second contents of the second input video feed through the output video feed.

9. The computer-implemented method of claim 8, wherein the first input video feed is not a duplicate of the second input video feed.

10. The computer-implemented method of claim 8, wherein the first input video feed is transmitted from a different location than the second input video feed.

11. The computer-implemented method of claim 8, wherein transmission of the first input video feed is initiated at a different time than the second input video feed.

12. The computer-implemented method of claim 8, wherein the one or more instability conditions comprise at least one of a disconnection, a transmission failure, a delay, an error, or a reduction in quality.

13. The computer-implemented method of claim 8, wherein the second input video feed is buffered during times when it is not visible to users but is not encoded during the times when it is not visible to users.

14. The computer-implemented method of claim 8, wherein the first input video feed is transmitted using at least one of a different type of network or a different transmission protocol than is used to transmit the second input video feed.

15. One or more non-transitory computer-readable storage media having stored thereon computing instructions that, upon execution by a computing device, cause the computing device to perform operations comprising:
    receiving, by a live video streaming service, from a user, redundancy instructions relating to switching an input to an output video feed from a first input video feed to a second input video feed in response to one or more instability conditions associated with the first input video feed, wherein the first input video feed includes video of a live event, wherein the user captures video that is included in the first input video feed at a venue at which the live event occurs and transmits the first input video feed from the venue to the live video streaming service, and wherein the redundancy instructions include authorization information that allows the user to identify the first input video feed to the live video streaming service;
    transmitting, by the live video streaming service, first contents of the first input video feed through an output video feed;
    detecting, by the live video streaming service, one or more instability conditions associated with the first input video feed;
    performing, by the live video streaming service, a switch of the input to the output video feed from the first input video feed to the second input video feed; and
    transmitting, by the live video streaming service, second contents of the second input video feed through the output video feed.

16. The one or more non-transitory computer-readable storage media of claim 15, wherein the one or more instability conditions comprise at least one of a disconnection, a transmission failure, a delay, an error, or a reduction in quality.

17. The one or more non-transitory computer-readable storage media of claim 15, wherein the second input video feed is buffered during times when it is not visible to users but is not encoded during the times when it is not visible to users.

18. The one or more non-transitory computer-readable storage media of claim 15, wherein the first input video feed is not a duplicate of the second input video feed.

19. The one or more non-transitory computer-readable storage media of claim 15, wherein the first input video feed is transmitted from a different location than the second input video feed.

20. The one or more non-transitory computer-readable storage media of claim 15, wherein transmission of the first input video feed is initiated at a different time than the second input video feed.

\* \* \* \* \*